United States Patent
Takayanagi

(10) Patent No.: US 8,599,037 B2
(45) Date of Patent: Dec. 3, 2013

(54) DOOR MIRROR FOR AN AUTOMOBILE

(75) Inventor: Shinya Takayanagi, Fujieda (JP)

(73) Assignee: Murakami Corporation, Shizuoka (JP)

( * ) Notice: Subject to any disclaimer, the term of this patent is extended or adjusted under 35 U.S.C. 154(b) by 138 days.

(21) Appl. No.: 13/351,428

(22) Filed: Jan. 17, 2012

(65) Prior Publication Data

US 2012/0235832 A1    Sep. 20, 2012

(30) Foreign Application Priority Data

Mar. 17, 2011    (JP) .................................. 2011-059630

(51) Int. Cl.
*G08G 1/00* (2006.01)
(52) U.S. Cl.
USPC ............ 340/901; 359/841; 359/843; 362/494
(58) Field of Classification Search
USPC ............... 340/901, 903, 435, 436, 468, 472; 359/267, 839, 841, 843; 362/494
See application file for complete search history.

(56) References Cited

U.S. PATENT DOCUMENTS

| | | | |
|---|---|---|---|
| 6,193,380 B1 * | 2/2001 | Jacobs ........................... | 359/843 |
| 6,264,353 B1 * | 7/2001 | Caraher et al. ................ | 362/494 |
| 6,572,233 B1 * | 6/2003 | Northman et al. ............ | 359/839 |
| 6,677,856 B2 * | 1/2004 | Perlman et al. ............... | 340/468 |
| 6,927,677 B2 * | 8/2005 | Anderson et al. ............. | 340/435 |
| 7,427,150 B2 * | 9/2008 | Carter et al. .................. | 362/494 |
| 7,477,137 B2 * | 1/2009 | Matsumoto et al. .......... | 340/436 |
| 7,517,099 B2 * | 4/2009 | Hannah ......................... | 359/841 |
| 2009/0063053 A1 * | 3/2009 | Basson et al. ..................... | 702/1 |
| 2012/0099173 A1 * | 4/2012 | Gentry et al. ................. | 359/265 |
| 2012/0320444 A1 * | 12/2012 | Baur et al. .................... | 359/267 |

FOREIGN PATENT DOCUMENTS

JP        2009-083631        4/2009

OTHER PUBLICATIONS

U.S. Appl. No. 13/351,502 to Shinya Takayanagi, which was filed on Jan. 17, 2012.

* cited by examiner

*Primary Examiner* — John A Tweel, Jr.
(74) *Attorney, Agent, or Firm* — Greenblum & Bernstein P.L.C.

(57) ABSTRACT

The door mirror for an automobile including a light diffusing section disposed between the side object detection symbols and the first and second LEDs. Relative dispositions between the side object detection symbols and the first and second LEDs are such that the optical axis of the first LED intersects with a host vehicle display section and the optical axis of the second LED intersects with an other vehicle display section. The relative dispositions enable uniform illumination of the side object detection symbols using the two LEDs. Furthermore, the optical axis of the first LED intersects with a light non-transmissive portion of the host vehicle display section and the optical axis of the second LED intersects with a light non-transmissive portion of the other vehicle display section.

4 Claims, 2 Drawing Sheets

DOOR MIRROR FOR AN AUTOMOBILE

BACKGROUND OF THE INVENTION

1. Field of the Invention

The present invention relates to a door mirror for an automobile including side object detection symbols of an ISO standard illuminated with two light-emitting diodes (LEDs).

2. Related Background Art

There is Japanese Patent Application Laid-Open Publication No. 2009-83631 disclosing known art in which a warning symbol is illuminated on a mirror surface of a door mirror. A vehicular door mirror disclosed in this publication includes a mirror board that is a transparent glass substrate having a back surface on which a semi-transmissive reflective film is vacuum-deposited. A mask member from which a warning symbol is cut out is affixed to this semi-transmissive reflective film. Light from an LED disposed on the side of a back surface of the mirror board transmits the warning symbol, which results in the warning symbol being displayed on a front surface of the mirror board. Examples of the warning symbol include a triangular mark and an exclamation mark.

SUMMARY OF THE INVENTION

The abovementioned triangular mark and exclamation mark used as the warning symbol have relatively simple shapes. However, side object detection symbols of an ISO standard are formed to include three display sections of a host vehicle display section disposed on the side of a driver's seat, an other vehicle display section disposed outside and obliquely rearwardly of the host vehicle display section, and a detected wave display section, disposed between the host vehicle display section and the other vehicle display section, for indicating a detected wave, and these display sections have complicated shapes. In order to illuminate uniformly the side object detection symbols with LEDs arrayed on a substrate, it is preferable to increase the number of LEDs and dispose the LEDs away from the side object detection symbols. However, the greater the number of LEDs, the higher the cost and the larger the circuit board; and the farther the LEDs are disposed away from the side object detection symbols, the more aggravated space efficiency.

It is an object of the present invention to provide a door mirror for an automobile that illuminates side object detection symbols of an ISO standard uniformly with two LEDs.

An aspect of the present invention provides a door mirror for an automobile including a first LED and a second LED for illuminating, from a back surface of a reflective mirror, side object detection symbols of an ISO standard. The side object detection symbols are constructed of a light transmissive portion and a light non-transmissive portion and include: a host vehicle display section disposed on a side of a driver's seat; an other vehicle display section disposed outside and obliquely rearwardly of the host vehicle display section; and a detected wave display section disposed between the host vehicle display section and the other vehicle display section, for indicating a detected. A light diffusing section is disposed between the side object detection symbols and the first and second LEDs; and relative dispositions between the side object detection symbols and the first and second LEDs disposed on a back surface side of the side object detection symbols are such that an optical axis of the first LED intersects with the host vehicle display section and an optical axis of the second LED intersects with the other vehicle display section.

The door mirror for an automobile includes the side object detection symbols of an ISO standard that are formed to include three display sections of the host vehicle display section disposed on the side of a driver's seat, the other vehicle display section disposed outside and obliquely rearwardly of the host vehicle display section, and the detected wave display section, disposed between the host vehicle display section and the other vehicle display section, for indicating a detected wave. If three LEDs are used for uniformly illuminating each of the display sections, a circuit board becomes large in size. If one LED is used so as to illuminate the center of the side object detection symbols in order to reduce the circuit board in size, a peripheral area of the side object detection symbols tends to be dark and it is difficult to illuminate the side object detection symbols uniformly. Thus, the light diffusing section is disposed between the side object detection symbols and the first and second LEDs, and the relative dispositions between the side object detection symbols and the first and second LEDs disposed on the back surface side of the side object detection symbols are arranged such that the optical axis of the first LED intersects with the host vehicle display section and the optical axis of the second LED intersects with the other vehicle display section. This achieves the side object detection symbols being uniformly illuminated with two LEDs.

It is preferable that the optical axis of the first LED intersect with the light non-transmissive portion of the host vehicle display section and the optical axis of the second LED intersect with the light non-transmissive portion of the other vehicle display section.

Incorporating such an arrangement allows light intensity of the side object detection symbols as viewed from a following vehicle to be reduced as compared with light intensity of the side object detection symbols as viewed from the driver's seat of the host vehicle, so that an effect of a steady light or a blinking light of the side object detection symbols on the driver of the following vehicle can be reduced.

Additionally, it is preferable that the optical axis of the first LED be located closer to the detected wave display section side relative to a central axis that divides the host vehicle display section into right and left sides within the host vehicle display section, and the optical axis of the second LED be located closer to the detected wave display section side relative to a central axis that divides the other vehicle display section into right and left sides within the other vehicle display section.

Incorporating such an arrangement allows brightness of the entire side object detection symbols to be made even more uniform, while reducing the effect of a steady light or a blinking light of the side object detection symbols on the driver of the following vehicle.

Additionally, it is preferable that the side object detection symbols be formed by subjecting the back surface of the reflective mirror to a blasting process or a laser etching process.

Incorporating such an arrangement allows the side object detection symbols themselves to have a light diffusing effect, so that the side object detection symbols can be illuminated even more uniformly. The same effect as that achieved by the blasting process can be achieved, in particular, from gas laser etching.

According to the aspect of the present invention, the side object detection symbols of an ISO standard can be uniformly illuminated using two LEDs.

Figure 2:
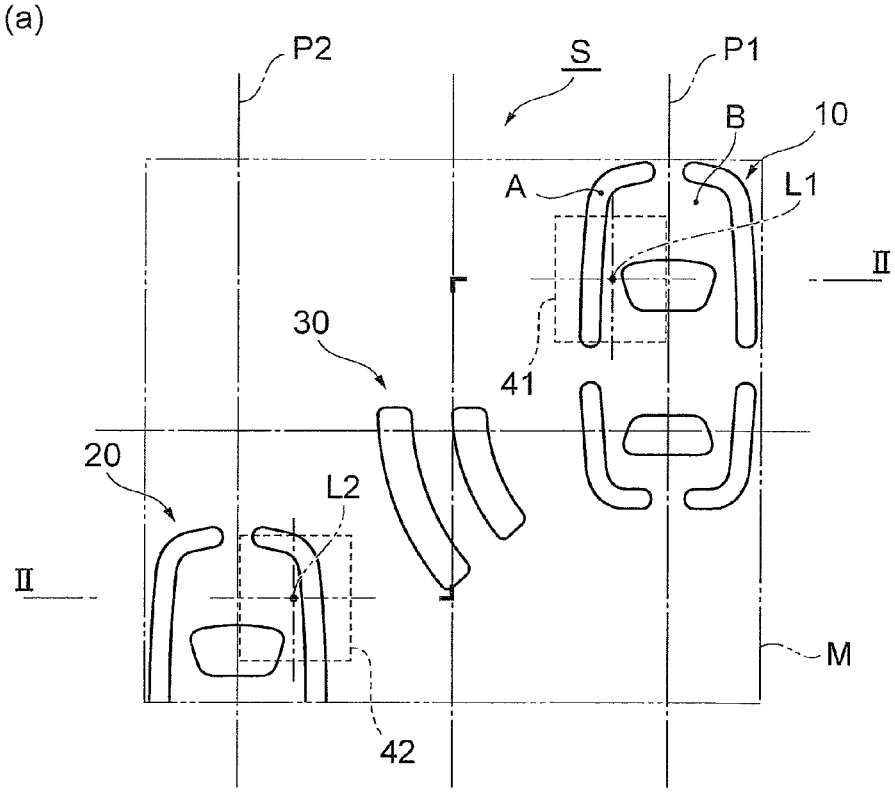
Figure 2:
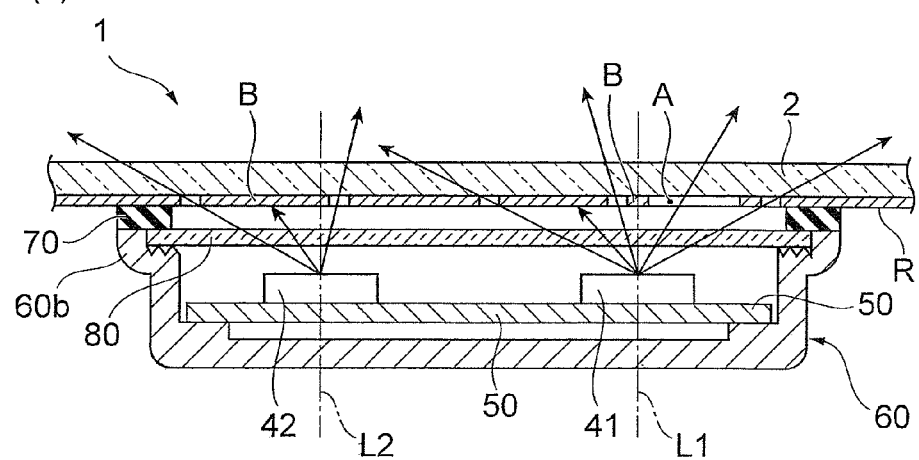

(a) of FIG. 2 is a plan view showing side object detection symbols and (b) of FIG. 2 is an end view taken along line II-II of (a) of FIG. 2.

DESCRIPTION OF THE PREFERRED EMBODIMENTS

A door mirror for an automobile according to a preferred embodiment of the present invention will be described in detail below with reference to the drawings.

Figure 1:
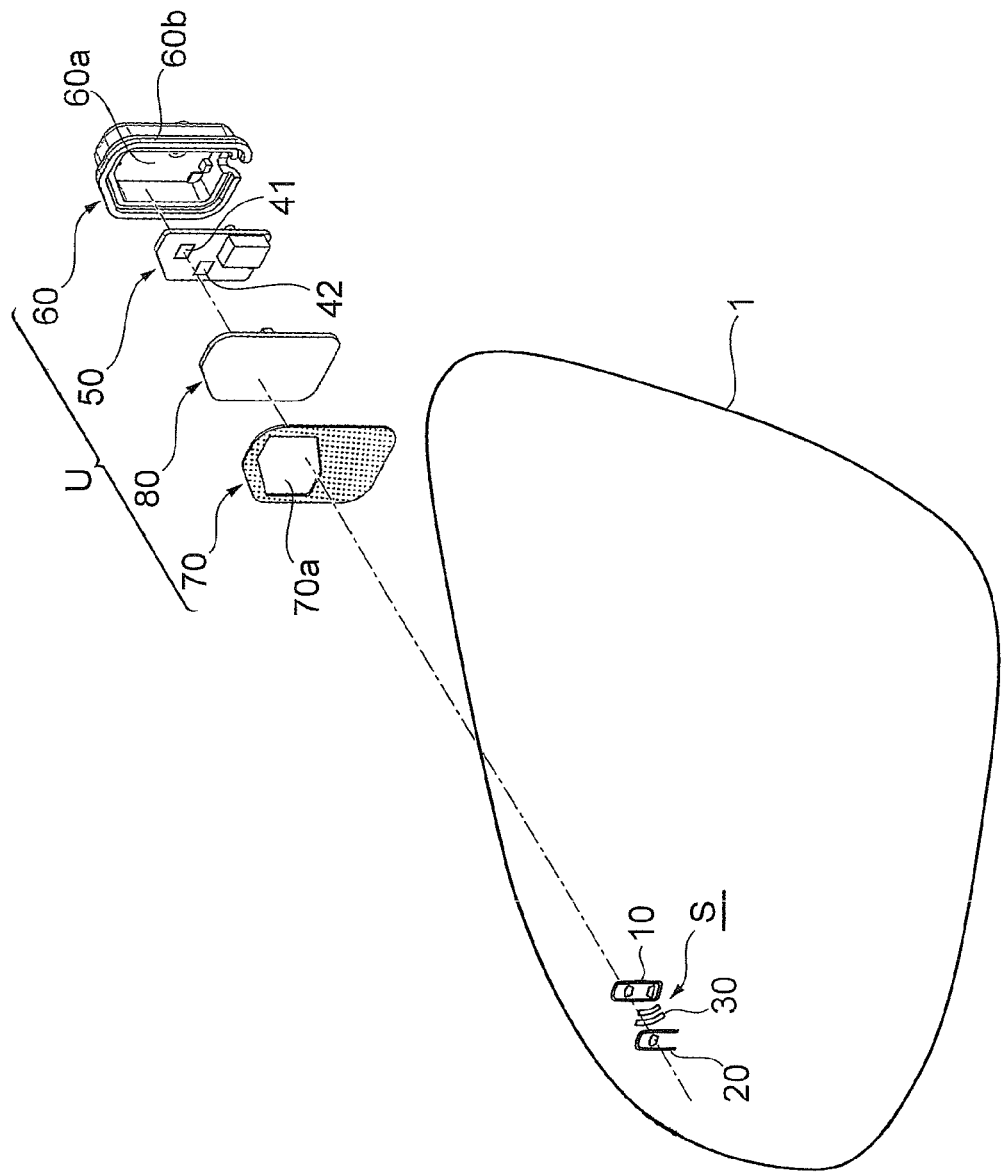
FIG. 1 is an exploded perspective view showing a reflective mirror and a lamp unit applied to a door mirror for an automobile according to an embodiment of the present invention.

Referring to FIG. 1, and (a) and (b) of FIG. 2, the door mirror for an automobile includes a reflective mirror 1 for viewing a rearward vehicle. The reflective mirror 1 is disposed so as to close an opening in a cup-shaped housing. A mechanism for moving the reflective mirror 1 is accommodated inside the housing. The reflective mirror 1 is transparent glass 2 having a back surface on which a reflective film R is vacuum-deposited. The reflective mirror 1 has the back surface covered in a resin mirror holder (not shown) and fitted and fixed in a circumferential edge of the mirror holder.

Side object detection symbols S of an ISO standard are formed on the reflective mirror 1. The side object detection symbols S include a host vehicle display section 10 disposed on the side of a driver's seat, an other vehicle display section 20 disposed outside and obliquely rearwardly of the host vehicle display section 10, and a detected wave display section 30, disposed between the host vehicle display section 10 and the other vehicle display section 20, for indicating a detected wave (for example, a laser wave).

The side object detection symbols S are formed on the back surface of the reflective mirror 1 by peeling the reflective film R from the transparent glass 2 through a blasting process or a laser etching process. The side object detection symbols S formed thereby are constructed of a light transmissive portion A and a light non-transmissive portion B.

In addition, a lamp unit U is affixed and fixed to the back surface of the reflective mirror 1. A first LED 41 and a second LED 42 for illuminating the side object detection symbols S are disposed inside the lamp unit U. Each of the first LED 41 and the second LED 42 is fixed on a circuit board 50. The circuit board 50 is fixed inside a lamp housing 60. The lamp housing 60 has an opening 60a that is larger than an area M surrounding the side object detection symbols S. Cushion tape 70 has a back surface attached to a circumferential edge of the opening 60a of the lamp housing 60. The cushion tape 70 has a front surface attached to the back surface of the reflective mirror 1.

The cushion tape 70 has an opening 70a that is one size larger than the area M. To ensure that the opening 70a is aligned with the position of the side object detection symbols S, the lamp housing 60 is affixed to the back side of the reflective mirror 1 using the cushion tape 70 with adhesive.

A plate-shaped light diffusing section 80 is fixed to the lamp housing 60 so as to close the opening 60a in the lamp housing 60. Each of the first LED 41 and the second LED 42 is accommodated inside a space defined by the light diffusing section 80 and the lamp housing 60. Additionally, a circumferential edge of the light diffusing section 80 is retained by an extension portion 60b formed on the side of the opening 60a in the lamp housing 60. Employing the light diffusing section 80 allows the first LED 41 and the second LED 42 to be disposed so as to be close to the side object detection symbols S, which enables the lamp housing 60 to be built thinner.

It is noted that the lamp unit U is formed to include the lamp housing 60, the first LED 41, the second LED 42, the circuit board 50, the light diffusing section 80, and the cushion tape 70. Consequently, assembly workability is improved by unitizing a light source.

In addition, as shown in (a) and (b) of FIG. 2, relative dispositions between the side object detection symbols S and the first and second LEDs 41, 42 disposed on the back surface side of the side object detection symbols S are such that the optical axis L1 of the first LED 41 intersects within the host vehicle display section 10 and the optical axis L2 of the second LED 42 intersects within the other vehicle display section 20.

Using three LEDs for uniformly illuminating each of the host vehicle display section 10, the other vehicle display section 20, and the detected wave display section 30 of the side object detection symbols S results in a larger circuit board. If one LED is used so as to illuminate the center of the side object detection symbols S in order to reduce the circuit board in size, a peripheral area of the side object detection symbols S tends to be dark and it is difficult to illuminate the side object detection symbols S uniformly.

Thus, the light diffusing section 80 is disposed between the side object detection symbols S and the first and second LEDs 41, 42, and the relative dispositions between the side object detection symbols S and the first and second LEDs 41, 42 are arranged such that the optical axis L1 of the first LED 41 intersects within the host vehicle display section 10 and the optical axis L2 of the second LED 42 intersects within the other vehicle display section 20. This achieves uniform illumination of the side object detection symbols S using the two first and second LEDs 41, 42.

In addition, the optical axis L1 of the first LED 41 intersects with the light non-transmissive portion B of the host vehicle display section 10 and the optical axis L2 of the second LED 42 intersects with the light non-transmissive portion B of the other vehicle display section 20. Incorporating such an arrangement allows light intensity of the side object detection symbols S as viewed from a following vehicle to be reduced as compared with light intensity of the side object detection symbols S as viewed from the driver's seat of the host vehicle, so that an effect of a steady light or a blinking light of the side object detection symbols S on the driver of the following vehicle can be reduced.

Furthermore, in addition to the optical axes L1, L2 intersecting with the light non-transmissive portion B, the optical axis L1 of the first LED 41 is located closer to the detected wave display section 30 side relative to a central axis P1 that divides the host vehicle display section 10 into right and left sides (right and left sides in a condition in which the door mirror is mounted in the vehicle body) within the host vehicle display section; and the optical axis L2 of the second LED 42 is located closer to the detected wave display section 30 side relative to a central axis P2 that divides the other vehicle display section 20 into right and left sides (right and left sides in a condition in which the door mirror is mounted in the vehicle body) within the other vehicle display section. Incorporating such an arrangement allows brightness of the entire side object detection symbols S to be made even more uniform, while reducing the effect of a steady light or a blinking light of the side object detection symbols S on the driver of the following vehicle.

The side object detection symbols S are formed by subjecting the back surface of the reflective mirror 1 to the blasting process or the laser etching process. Incorporating such an arrangement allows the side object detection symbols S themselves to have a light diffusing effect, so that the side object detection symbols S can be illuminated even more uniformly.

The same effect as that achieved by the blasting process can be achieved, in particular, from gas laser etching.

It is to be understood that the present invention is not limited to the embodiment described above. For example, when the side object detection symbols S are to be formed on the back surface of the reflective mirror 1 through the laser etching process, the light diffusing effect can be achieved by roughing the surface of the transparent glass 2 in one case, and in the other, the reflective film R is simply peeled off without the surface of the transparent glass 2 being roughed.

What is claimed is:

1. A door mirror for an automobile comprising:
   a first light-emitting diode (LED); and
   a second LED,
   the first LED and the second LED illuminating, from a back surface of a reflective mirror, side object detection symbols of an ISO standard,
   the side object detection symbols constructed of a light transmissive portion and a light non-transmissive portion and comprising:
     a host vehicle display section disposed on a side of a driver's seat;
     an other vehicle display section disposed outside and obliquely rearwardly of the host vehicle display section; and
     a detected wave display section disposed between the host vehicle display section and the other vehicle display section, for indicating a detected wave, wherein
   a light diffusing section is disposed between the side object detection symbols and the first and second LEDs,
   relative dispositions between the side object detection symbols and the first and second LEDs disposed on a back surface side of the side object detection symbols are such that an optical axis of the first LED intersects with the host vehicle display section and an optical axis of the second LED intersects with the other vehicle display section.

2. The door mirror for an automobile according to claim 1, wherein the optical axis of the first LED intersects with the light non-transmissive portion of the host vehicle display section and the optical axis of the second LED intersects with the light non-transmissive portion of the other vehicle display section.

3. The door mirror for an automobile according to claim 2, wherein the optical axis of the first LED is located closer to the detected wave display section side relative to a central axis that divides the host vehicle display section into right and left sides within the host vehicle display section, and the optical axis of the second LED is located closer to the detected wave display section side relative to a central axis that divides the other vehicle display section into right and left sides within the other vehicle display section.

4. The door mirror for an automobile according to claim 1, wherein the side object detection symbols are formed by subjecting the back surface of the reflective mirror to a blasting process or a laser etching process.

* * * * *